United States Patent Office.

EBEN N. HORSFORD, OF CAMBRIDGE, MASSACHUSETTS.

Letters Patent No. 76,763, dated April 14, 1868.

IMPROVED METHOD OF PREPARING ACID PHOSPHATE OF LIME.

The Schedule referred to in these Letters Patent and making part of the same.

TO ALL WHOM IT MAY CONCERN:

Be it known that I, EBEN N. HORSFORD, of Cambridge, in the county of Middlesex, and the State of Massachusetts, have invented a new and improved Method of Preparing Acid Phosphate of Lime; and I do hereby declare that the following is a full and exact description thereof.

My invention consists in the use or employment of a pure or purified sulphuric acid, in the manufacture of pulverulent acid phosphate of lime, when such acid phosphate is so manufactured as to contain gypsum or sulphate of lime derived from the phosphate of lime used in making said pulverulent acid phosphate for the purpose of raising bread.

Commercial and ordinary oil of vitriol contains a proportion of sulphate of lead, which is highly poisonous, and therefore unsuited to be employed in the manufacture of articles of food. Such oil of vitriol has been heretofore used by me in the manufacture of pulverulent acid phosphate of lime, when so manufactured as to contain gypsum or sulphate of lime derived from the phosphate of lime used in making said pulverulent acid for the purpose of raising bread. It has, however, proved that bread raised by such acid phosphate of lime is poisonous. In order to be able to use such acid phosphate of lime for this purpose, I made an improved process of manufacturing the same, by depriving the oil of vitriol of its sulphate of lead before using it in making said acid phosphate.

My process for eliminating the sulphate of lead is as follows: After having determined the quantity of sulphuric acid to be employed in the operation, I dilute the oil of vitriol or commercial sulphuric acid with pure water until the sulphate of lead is precipitated. The usual mode, after having ascertained the proportion of water to oil of vitriol, is to pour the oil of vitriol in a slender stream into the water with constant stirring. When the sulphate of lead has settled out, I draw off the diluted acid, which may or may not be thereafter concentrated in appropriate vessels. I do not confine myself to this method of separating the sulphate of lead from oil of vitriol, or to any particular method.

I then proceed as follows: I dissolve phosphate of lime derived from burned bones or mineral sources in nitric, hydrochloric, or other volatile acid, diluted with an adequate quantity of water, making a saturated or nearly saturated solution. This solution I filter to remove any solid impurities that may be present, and add in proper proportion to the filtered liquor, the sulphuric acid freed of its lead, as above described. There results an immediate precipitation of sulphate of lime, with the disengagement of the volatile acid employed to dissolve the phosphate of lime. On the application of heat, the volatile acid and water are expelled, and there remain acid phosphate of lime and sulphate of lime, with traces of other salts in condition to be readily reduced to powder.

What I claim, and desire to secure by Letters Patent of the United States, as my invention, is—

The use of sulphuric acid or oil of vitriol of commerce, purified as above described, to be employed in the manufacture of pulverulent acid phosphate of lime, when such acid phosphate is so manufactured as to contain gypsum or sulphate of lime derived from the phosphate of lime used in making said pulverulent acid phosphate for the purpose of raising bread.

E. N. HORSFORD.

Witnesses:
   GEO. F. WILSON,
   M. G. HOWE.